(12) United States Patent
Aikawa et al.

(10) Patent No.: US 7,288,143 B2
(45) Date of Patent: Oct. 30, 2007

(54) WATER-BASED INK, INK TANK HAVING THE SAME, AND INK-JET RECORDING PROCESS

(75) Inventors: Yoshihide Aikawa, Yokohama (JP); Shinichi Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 385 days.

(21) Appl. No.: 11/006,625

(22) Filed: Dec. 8, 2004

(65) Prior Publication Data

US 2005/0131104 A1   Jun. 16, 2005

(30) Foreign Application Priority Data

Dec. 10, 2003 (JP) .............................. 2003-412455

(51) Int. Cl.
    *C09D 11/00* (2006.01)
    *C09D 11/02* (2006.01)
    *B41J 2/01* (2006.01)

(52) U.S. Cl. .............................. 106/31.58; 106/31.51; 106/31.52; 347/100

(58) Field of Classification Search ............. 106/31.27, 106/31.58, 31.51, 31.52; 347/100
See application file for complete search history.

(56) References Cited

U.S. PATENT DOCUMENTS 5,482,545 A * 1/1996 Aoki et al. ............... 106/31.43

| 2003/0070580 | A1* | 4/2003 | Blease et al. ............ 106/31.27 |
| 2003/0095169 | A1* | 5/2003 | Ito et al. ...................... 347/100 |
| 2004/0080597 | A1* | 4/2004 | Yakushigawa et al. ..... 347/100 |
| 2005/0087100 | A1* | 4/2005 | Blease et al. ............ 106/31.47 |
| 2005/0115458 | A1* | 6/2005 | Oki et al. ................. 106/31.47 |

FOREIGN PATENT DOCUMENTS

JP         2522325         5/1996

* cited by examiner

*Primary Examiner*—Helene Klemanski
(74) *Attorney, Agent, or Firm*—Fitzpatrick, Cella, Harper & Scinto

(57) ABSTRACT

A water-based ink containing a water-soluble dimer coloring material having a molecular structure having two chromophores and being symmetrical via a decomposable linking group, a water-soluble monomer coloring material having the same structure as the molecular structure obtained by the decomposition of the linking group in the water-soluble dimer coloring material, and a first water-soluble organic solvent which is a triol compound being liquid at normal temperature and having less than 5 carbon atoms, capable of restraining the water-soluble dimer coloring material from being decomposed. The water-soluble monomer coloring material is from 1% or more to 12% or less in weight with respect to the weight of the water-soluble dimer coloring material. Also disclosed are an ink tank holding therein this ink, and an ink-jet recording process carried out using this ink.

16 Claims, 5 Drawing Sheets

WATER-BASED INK, INK TANK HAVING THE SAME, AND INK-JET RECORDING PROCESS

BACKGROUND OF THE INVENTION

1. Field of the Invention

This invention relates to a water-based ink used chiefly in ink-jet recording, an ink tank having the ink, and an ink-jet recording process.

2. Related Background Art

Hitherto, changes in tone of recorded images are taken up as a technical subject in the field of ink-jet recording. As the changes in tone of images, it may be mentioned that images recorded on recording mediums undergo discoloration due to light, the air and so forth. Besides inks stored in ink tanks over a certain period of time undergo deterioration with time and images recorded using such inks undergo changes in tone compared with images recorded using unstored fresh inks. The cause of the changes in tone of images recorded using inks stored over a certain period of time is also chiefly the deterioration of coloring materials.

As a main measure against this subject, it may be mentioned that a different coloring material which relatively can not easily deteriorate is additionally incorporated so that, even when an original coloring material has deteriorated, the changes in tone of images can consequently be restrained by the effect the coloring material incorporated additionally has.

Meanwhile, the reliability of inks has also been a technical subject for a long time, as exemplified by the deposition of coloring materials at nozzles of recording heads.

As a measure against this subject, it is proposed to incorporate in an ink a monomethyl ether compound of propylene oxide (e.g., Japanese Patent No. 2522325).

However, incorporation of many kinds of coloring materials in an ink in order to restrain the changes in tone of images may lead to a rise in cost. Also, depending on the tone of a coloring material additionally incorporated, initial-stage images may have an undesirable tone. Moreover, since individual coloring materials have different characteristics, a solvent, additives and so forth must further be added in order to restrain a difficulty that other ink performance, in particular, ink reliability may come poor. This may make ink formulation complicate. In ink tanks holding inks of this type, it has been difficult to improve storage stability.

SUMMARY OF THE INVENTION

Accordingly, a first subject of the present invention is to provide a water-based ink that has come free of the "changes in tone" without any additional use of other coloring material, and also has secured reliability.

A second subject of the present invention is to also provide an ink tank which holds therein the above water-based ink so as to enhance storage stability, and an ink-jet recording process making use of such a water-based ink.

Accordingly, the present inventors have accomplished this invention on the basis of findings obtained from analyses made on coloring materials.

The first-category invention according to the first subject of the present invention is a water-based ink, which comprises a water-soluble dimer coloring material having a molecular structure having two chromophores and being symmetrical via a decomposable linking group, a water-soluble monomer coloring material having the same structure as the molecular structure obtained by the decomposition of the linking group in the water-soluble dimer coloring material, and a first water-soluble organic solvent which is a triol compound being liquid at normal temperature and having less than 5 carbon atoms, capable of restraining the water-soluble dimer coloring material from being decomposed; the water-soluble monomer coloring material being from 1% or more to 12% or less in weight with respect to the weight of the water-soluble dimer coloring material.

The second-category invention according to the second subject of the present invention is an ink tank characterized by holding therein the above water-based ink.

The third-category invention according to the second subject of the present invention is an ink-jet recording process comprising ejecting an ink from an orifice in accordance with recording signals to perform recording on a recording medium, wherein the ink is the above water-based ink.

DESCRIPTION OF THE PREFERRED EMBODIMENTS

Figure 1:
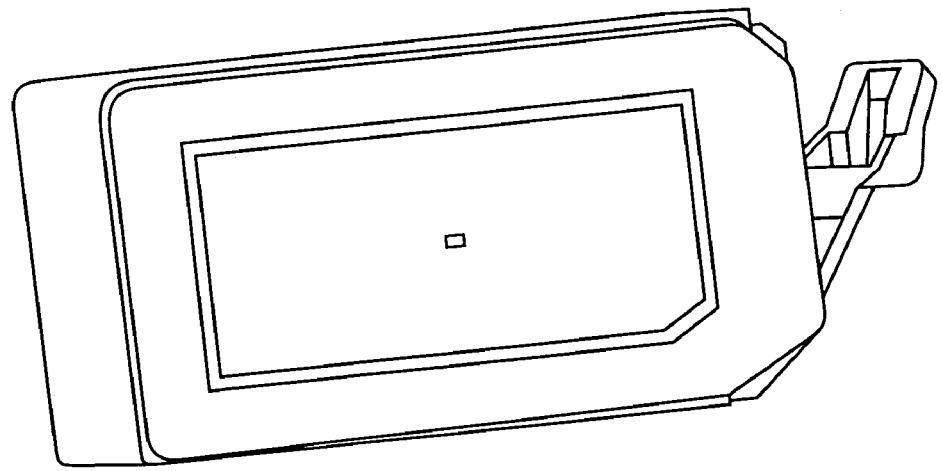
FIG. 1 is an appearance perspective view showing an ink tank not making use of any absorber member as a negative-pressure generation mechanism in an ink container in an embodiment of the present invention.

The present invention is described below in detail by giving best embodiments of the present invention.

It has come to light that the present invention enables restraint of the changes in tone of images while securing ink reliability as long as a water-based ink is used which comprises a water-soluble dimer coloring material having a molecular structure having two chromophores and being symmetrical via a decomposable linking group, a water-soluble monomer coloring material having the same structure as the molecular structure obtained by the decomposition of the linking group in the water-soluble dimer coloring material, and a first water-soluble organic solvent which is a triol compound being liquid at normal temperature and having less than 5 carbon atoms, capable of restraining the water-soluble dimer coloring material from being decomposed; the water-soluble monomer coloring material being from 1% or more to 12% or less in weight with respect to the weight of the water-soluble dimer coloring material.

In the present invention, the water-soluble monomer coloring material may preferably be from 1% or more to 8% or less in weight with respect to the weight of the water-soluble dimer coloring material.

Incidentally, the "water-soluble dimer coloring material having a molecular structure having two chromophores and being symmetrical via a linking group" is meant to be such a coloring material that forms two compounds (chromophores) having the same structures, upon decomposition of the linking group. Also, coloring materials having the same structures as the respective compounds formed are each called the "water-soluble monomer coloring material having the same structure as the molecular structure obtained by the decomposition of the linking group in the water-soluble dimer coloring material". Further, the linking group is meant by a moiety which links a plurality of molecular structures (structural units) having chief chromophores.

For example, an Na salt of such a water-soluble dimer coloring material C.I. Direct Yellow 132 is represented by the following structure.

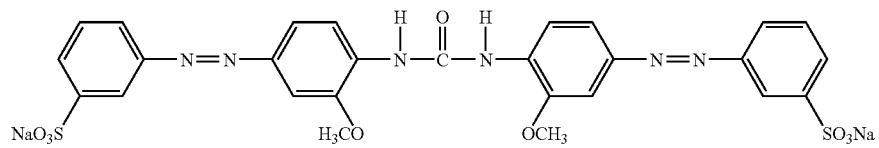

Then, an Na salt of the water-soluble monomer coloring material formed upon decomposition of the linking group of this coloring material is represented by the following structure.

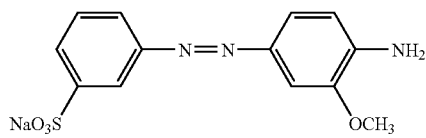

From these facts, it is seen that the linking group of C.I. Direct Yellow 132 is a urea bond moiety.

The present inventors have stored over various periods of time various inks containing the water-soluble dimer coloring material, and have formed ink-jet recorded images by using inks in which the water-soluble monomer coloring material and the water-soluble dimer coloring material have been made to have different numbers of molecules in various proportions by decomposing the coloring material. As the result, it has turned out that, as long as the ink is used in which the water-soluble monomer coloring material is 12% or less in weight with respect to the weight of the water-soluble dimer coloring material, images recorded using such an ink may practically undergo no change in tone compared with images recorded using an ink in which the water-soluble dimer coloring material is not decomposed.

What is meant by "undergo practically no change in tone" is that the color difference $\Delta E \ (=[(\Delta L^*)^2+(\Delta a^*)^2+(\Delta b^*)^2]^{1/2})$ prescribed by CIE, of solid gradation of each of monochromatic inks shows 3.2 or less.

The value of 3.2 or less indicates that the color difference is equal to or smaller than the value of 1.6 to 3.2 lying within the range of $\Delta E$ (which is A-class tolerance and the color difference almost not noticeable in separate comparison, and is the level considered to be the same color in general). Incidentally, as also described in Examples given later, in the present invention, solid images having different duties of 10% to 100% at the intervals of 10% are formed using each ink before and after storage, and images having the same duty are compared with each other, where the largest value of $\Delta E$ is employed.

It has also turned out that, in virtue of the use of the first water-soluble organic solvent capable of restraining the water-soluble dimer coloring material from being decomposed, the weight of the water-soluble monomer coloring material is only 12% or less with respect to the weight of the water-soluble dimer coloring material even when the ink is stored for a period of actual use (corresponding to at 25° C. and for three years). It is presumed that, although the mechanism of restraining the decomposition of the water-soluble dimer coloring material is uncertain, the presence of the first water-soluble organic solvent (or this and the water-soluble monomer coloring material) restrains hydrolysis of the water-soluble dimer coloring material.

The presence of the water-soluble monomer coloring material in a weight of 1% or more with respect to the weight of the water-soluble dimer coloring material also enables achievement of the ink reliability that coloring materials-can be restrained from their deposition at the nozzles and the like of the recording head. The mechanism by which this water-soluble monomer coloring material brings an improvement in the ink reliability is uncertain. It is presumed that the water-soluble monomer coloring material restrains the water-soluble dimer coloring material from its deposition that accompanies its agglomeration, caused by the evaporation of vaporizable components such as water in the ink.

The content of the first water-soluble organic solvent may be adjusted within the range where the water-soluble dimer coloring material in the ink can be restrained from its deposition and images may undergo practically no change in tone during the storage for a period of actual use. Where other ink performance as well is taken into account, the first water-soluble organic solvent may preferably be in a content of from 3% by weight or more to 8% by weight or less, and more preferably from 3.5% by weight or more to 5% by weight or less based on the total weight of the ink.

The first water-soluble organic solvent which is a triol compound being liquid at normal temperature and having less than 5 carbon atoms may include as its types 1,2,4-butanetriol, 2-(hydroxymethyl)-1,3-propanediol, and glycerol. In particular, glycerol is preferred.

The water-soluble dimer coloring material used in the present invention is one having a decomposable linking group, and hence may include azo type direct dyes having a urea bond as the linking group. Such dyes may be exemplified by C.I. Direct Yellow 26, C.I. Direct Yellow 33, C.I. Direct Yellow 44, C.I. Direct Yellow 50, C.I. Direct Yellow 132, C.I. Direct Red 4, C.I. Direct Red 23, C.I. Direct Red 75, C.I. Direct Red 79, C.I. Direct Red 80, C.I. Direct Red 83, C.I. Direct Red 84, C.I. Direct Orange 26, C.I. Direct Orange 29, C.I. Direct Orange 72, C.I. Direct Violet 47, C.I. Direct Brown 106, C.I. Direct Brown 112 and so forth.

The water-soluble dimer coloring material used in the present invention may preferably be one having high chromophoric properties and a high image color fastness. Also, in the present invention, the ink is preferable because it is more effective in the prevention of changes in tone and the ink reliability when the water-soluble dimer coloring material is contained in an amount of from 1% by weight or more to 5% by weight or less, and preferably from 2% by weight or more to 4% by weight or less based on the total weight of the ink. In the present invention, as the water-soluble dimer coloring material, two or more kinds of coloring materials may also be used, or a coloring material other than the water-soluble dimer coloring material may be used as long as the remarkable effect to be brought by the present invention is obtainable.

As to the water-soluble monomer coloring material, it is the one having the same structure as the molecular structure obtained by the decomposition of the linking group in the water-soluble dimer coloring material.

The ink of the present invention may preferably further have a second water-soluble organic solvent which is a triol compound being liquid at normal temperature and having 5 or more carbon atoms. As the second water-soluble organic solvent, it may preferably be any of 3-methyl-1,3,5-pentanetriol and 1,2,6-hexanetriol. In particular, 1,2,6-hexanetriol is preferred. Even where the vaporizable components in the ink have evaporated to a certain extent, the second water-soluble organic solvent, having carbon atoms in a large number, is presumed to act to restrain coloring materials from their deposition that accompanies their agglomeration, in virtue of the spacer effect due to the carbon chains the second water-soluble organic solvent has.

According to studies made by the present inventors, it is also preferable that, aiming at achievement of both the restraining of changes in tone of images and the restraining of deposition of coloring materials, the ink according to the present invention is so constituted that the first water-soluble organic solvent and the second water-soluble organic solvent are in a total content of from 5% by weight or more to 13% by weight or less based on the total weight of the ink. Taking account of other ink performance as well, it is more preferable that they are in a total content of from 6% by weight or more to 10% by weight or less in the ink. It is further preferable that the first water-soluble organic solvent held in the total content of the first water-soluble organic solvent and second water-soluble organic solvent is in a proportion of from 40% by weight or more to 60% by weight or less. Setting the proportion in this way is more effective in the restraining of changes in tone of images and deposition of coloring materials.

The ink of the present invention may preferably further have at least one of diethylene glycol, triethylene glycol and tetraethylene glycol. For example, polyethylene glycol 200 may be used. The use of at least one of these ethylene glycols enables coloring materials to be restrained from their deposition even where vaporizable components in the ink have further evaporated.

According to studies made by the present inventors, it is also preferable that, especially aiming at achievement of both the restraining of changes in tone of images and the restraining of deposition of coloring materials, the ink according to the present invention is so constituted that the first water-soluble organic solvent, the second water-soluble organic solvent, the diethylene glycol, the triethylene glycol and the tetraethylene glycol are in a total content of from 10% by weight or more to 30% by weight or less in the ink. Taking account of other ink performance as well, it is more preferable that they are in a total content of from 15% by weight or more to 25% by weight or less in the ink. It is further preferable that the first water-soluble organic solvent held in the total content of the first water-soluble organic solvent, second water-soluble organic solvent, diethylene glycol, triethylene glycol and tetraethylene glycol is in a proportion of from 10% by weight or more to 30% by weight or less. Setting the proportion in this way is very effective in the restraining of changes in tone of images and deposition of coloring materials.

If a substance which decomposes and changes in time sequence is contained in the ink of the present invention, the water-soluble monomer coloring material or the water-soluble dimer coloring material may come deposited by the effect of salting-out the substance has. Hence, it is preferable for the ink not to contain such a substance. For example, where urea is added to the ink containing the water-soluble monomer coloring material and water-soluble dimer coloring material and these are stored over a long period of time and at a high temperature in the state of an ink, ammonium ions, carbonate ions and so forth are formed which are produced by the decomposition of urea in the ink, so that the water-soluble monomer coloring material and the water-soluble dimer coloring material may salt out. Hence, it is preferable for the ink of the present invention not to contain the urea.

As the water-soluble dimer coloring material used in the ink of the present invention any coloring material may be used as long as it is one in which the linking group contained in the coloring material is decomposable. It, however, is necessary to prevent ink reliability from being adversely affected by the monomer coloring material formed by decomposition and residual groups of linking groups. From this point of view, the water-soluble dimer coloring material may preferably have a urea bond as the linking group. This is because, inasmuch as it has a urea bond, two molecules of monomer coloring materials having entirely the same molecular structure are formed upon decomposition of one molecule of the dimer coloring material, and the ink exhibits good ink-jet recording performance without damaging the ink reliability.

As the water-soluble dimer coloring material used in the ink of the present invention, any coloring material may be used as long as it has molecular structure which is symmetrical via the linking group and is decomposable. The preferable compounds are listed above, in particular, C.I. Direct Yellow 132 is preferred, having a urea bond as the linking group. Also, the ink may have a pH of less than 7, and this is preferable in that recorded images with less changes in tone can be formed on acidic recording mediums which are available in relatively many kinds.

In regard to the physical properties of the ink, they may preferably be controlled from the viewpoint of ink-jet adaptability. The ink may preferably have a surface tension of from 20 to 50 mN/m, and more preferably from 28 to 43 mN/m. The ink may preferably have a viscosity of from 1.5 to 3.5 mPa.s, and more preferably from 2.0 to 2.6 mPa.s. The ink may preferably have pH in the range of from 4.0 to 10.5.

The ink according to the present invention may preferably be used in the state it is held in an ink tank.

The ink tank of the present invention may have forms as exemplified by those shown in FIGS. 1 to 5, in which it has a negative-pressure generation mechanism at some part, or in the whole, of its ink container. It may also have a form as shown in FIG. 6, in which it has nozzles through which the ink is ejected. Further, it may also have a form by combining the both types.

Figure 2:
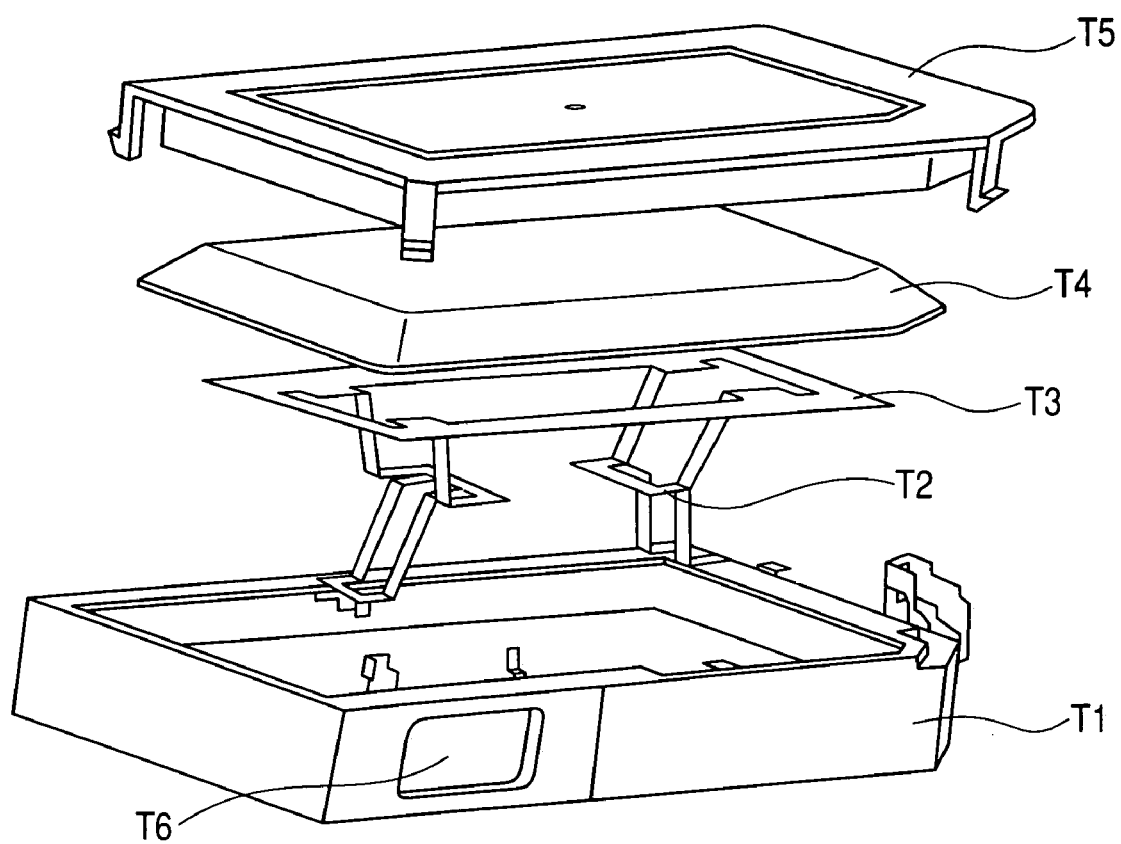
FIG. 2 is a view showing an internal structure of the ink tank shown in FIG. 1.
Figure 3:
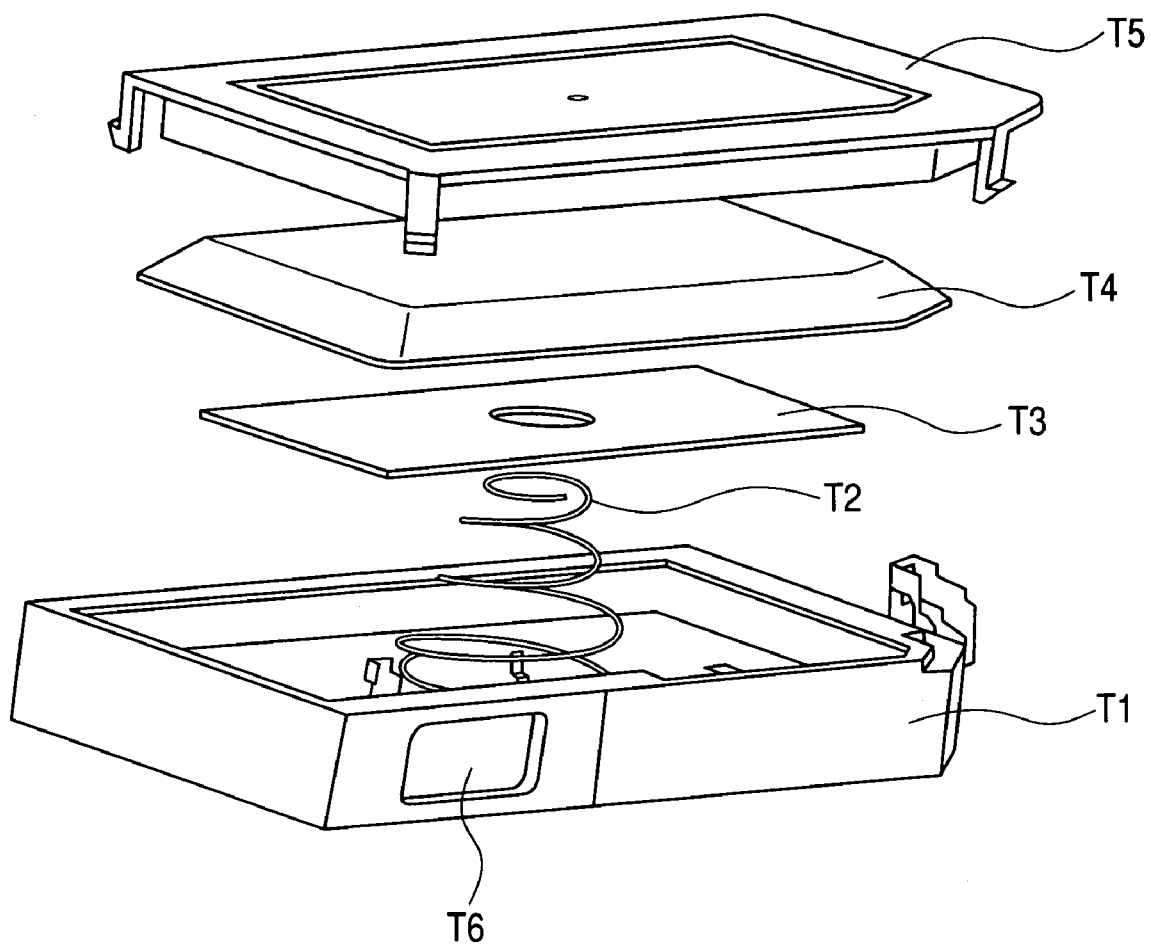
FIG. 3 is a view showing another internal structure of the ink tank shown in FIG. 1.

The ink tank having the form shown in FIG. 1 is an example having construction where a member other than an absorber is used as the negative-pressure generation mechanism in the ink container. FIG. 1 is an appearance perspective view of the ink tank, and FIGS. 2 and 3 are views showing internal structures of the ink tanks.

The ink tanks in these drawings each have a housing (fixed member) T1 which forms the ink tank, an ink container T4 formed of a flexible member which deforms as the ink is led out, a spring member T2 as a negative-pressure generation mechanism, a plane-shaped member T3 for transmitting to the ink container T4 the pressure generated by the spring member T2, and a cover member T5 for protecting the ink container T4. The housing T1 is provided with an ink feed opening for leading out the ink. The ink feed opening is, in order to prevent leakage of the liquid held in the interior, sealed with a capillary force generation member such as a rubber member (not shown) provided with slits, an absorber (not shown) for generating meniscus force which can withstand the negative pressure generated by the spring, or a filter T6. Here, a type of the filter is shown in the drawing.

The spring member T2 may have any shape or form as long as it generates a load which fulfill its pressure in the state the liquid-holding container is in use. Here are illustrated a leaf spring type (B-1) and a coil spring type (B-2). Further, in the spring type, the plane-shaped member T3 and the spring member T2 may be set integral.

Figure 4:
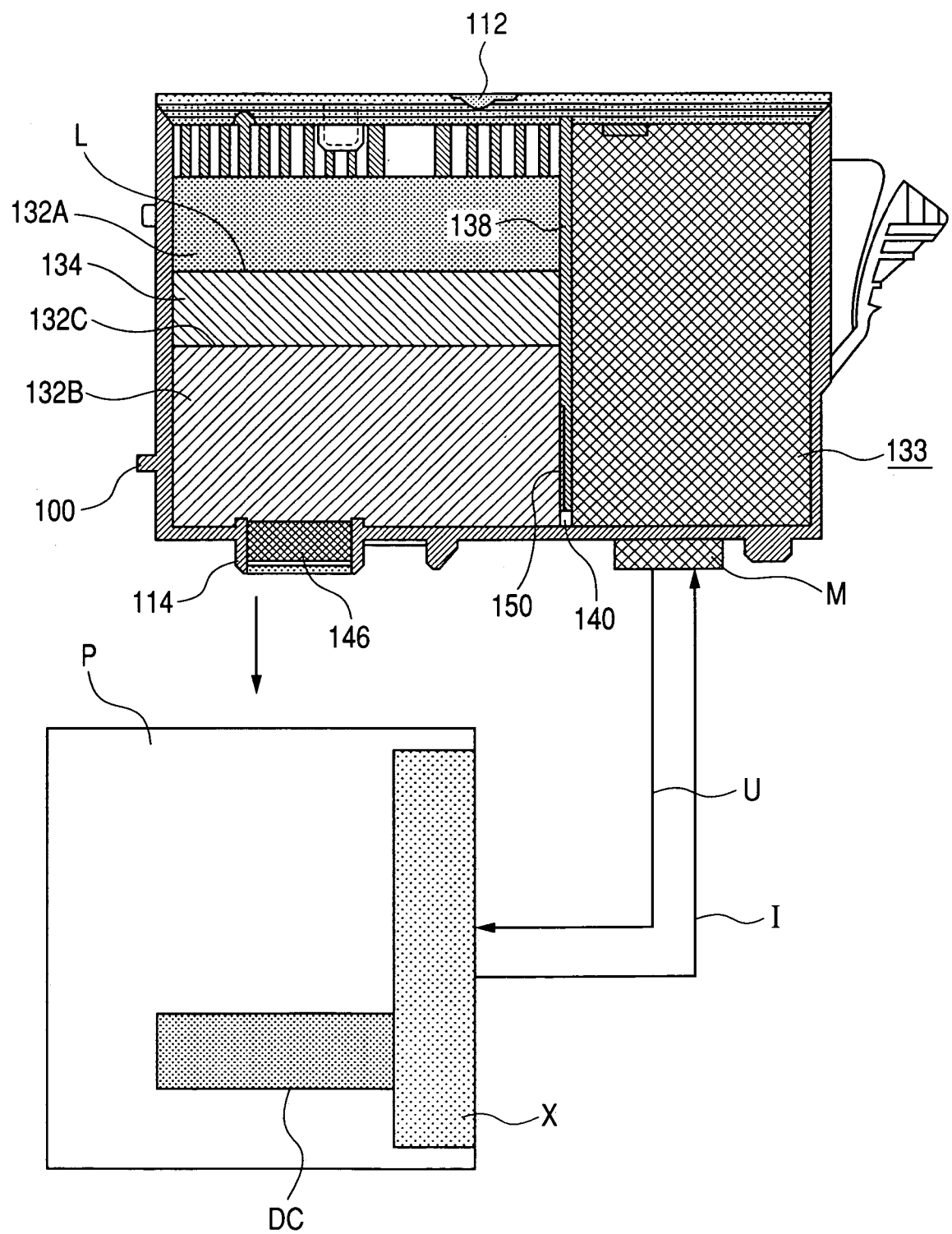
FIG. 4 is a schematic illustration of an ink tank making use of an absorber member as a negative-pressure generation mechanism at some part of an ink container in an embodiment of the present invention.

FIG. 4 is a schematic illustration of an ink tank making use of an absorber member as a negative-pressure generation mechanism at some part of an ink container in an embodiment of the present invention.

As shown in FIG. 4, an ink tank 100 is partitioned with a partition wall 138 into i) a negative-pressure generation member holding chamber 134 which communicates the atmosphere at its upper part through an atmosphere communication opening 112, communicates an ink feed opening 114 at its lower part and holds a negative-pressure generation member (consisting of 132A, 132B and 132C) in its interior, and ii) a liquid-holding chamber 136 kept substantially tightly closed which holds therein a liquid ink. Then, the negative-pressure generation member holding chamber 134 and the liquid-holding chamber 136 are made to communicate with each other only through a communicating part 140 formed in the partition wall 138 in the vicinity of the bottom of the ink tank 100 and an air lead-in path 150 for helping the air to be readily led in the liquid-holding chamber 136 at the time of liquid-feeding operation. At the top wall of the ink tank 100 at its part which defines the negative-pressure generation member holding chamber 134, a plurality of ribs are integrally formed in such a form that they protrude inward, and come into contact with the negative-pressure generation member held in the negative-pressure generation member holding chamber 134 in a compressed state. In virtue of the ribs, an air buffer chamber is formed between the top wall and the upper surface of the negative-pressure generation member.

An ink feed barrel having the ink feed opening 114 is provided with a pressure contact member 146 having a higher capillary force and a stronger physical strength than the negative-pressure generation member, and comes into pressure contact with the negative-pressure generation member at its bottom.

The negative-pressure generation member holding chamber 134 holds therein as the negative-pressure generation member two capillary force generation type negative-pressure generation members, i.e., a first negative-pressure generation member 132B and a second negative-pressure generation member 132A which are formed of fibers of olefin type resin such as polyethylene and so on. Reference numeral 132C denotes a boundary layer of these two negative-pressure generation members, and the part where the boundary layer 132C and the partition wall 138 cross is present at an upper part than the top end of the air lead-in path 150 in a posture kept when the ink tank (liquid-holding container) is in use with its communicating part 140 down. Also, the ink held in the negative-pressure generation member is present up to an upper part than the boundary layer 132C as shown by a liquid level L of the ink.

Here, the boundary layer between the first negative-pressure generation member and the second negative-pressure generation member is kept in pressure contact with these members, and the boundary layer has, in its vicinities of these negative-pressure generation members, a higher compressibility than the other portions to come into a state that it has a strong capillary force. More specifically, where the capillary force the first negative-pressure generation member has is represented by P1, the capillary force the second negative-pressure generation member has by P2, and the capillary force these negative-pressure generation members have each other at their interfaces by PS, it stands P2<P1<PS.

Figure 5:
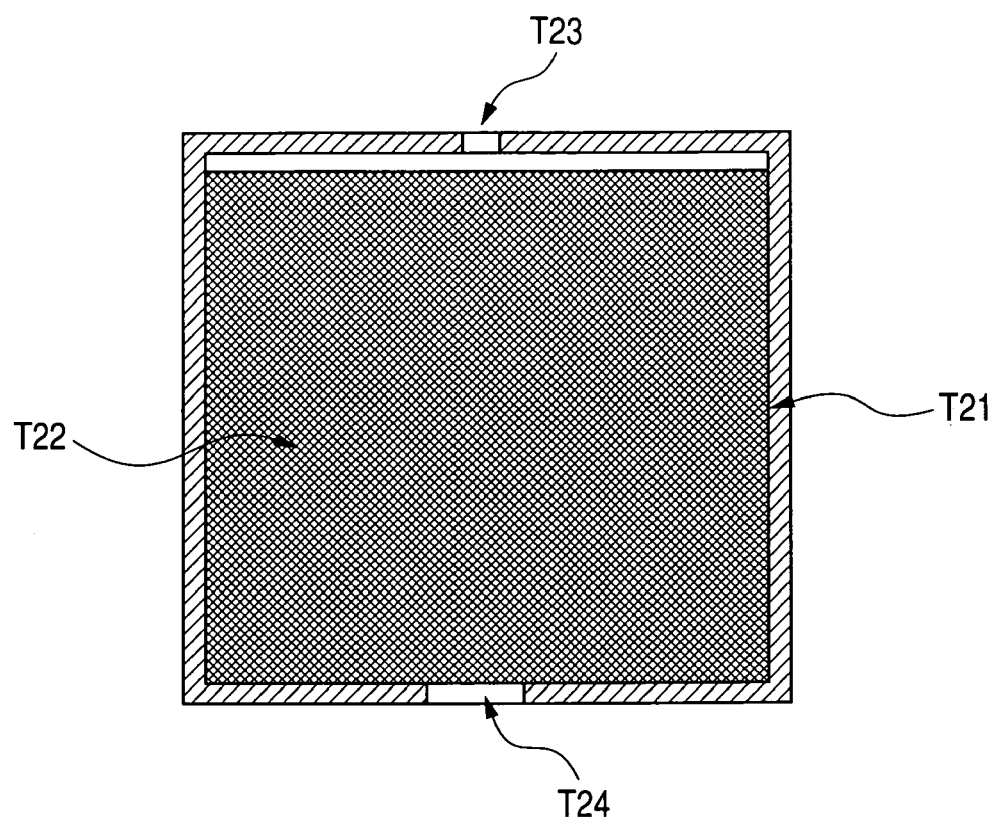
FIG. 5 is a view showing an internal structure of an ink tank making use of an absorber member as a negative-pressure generation mechanism in the whole of an ink container in an embodiment of the present invention.
Figure 6:
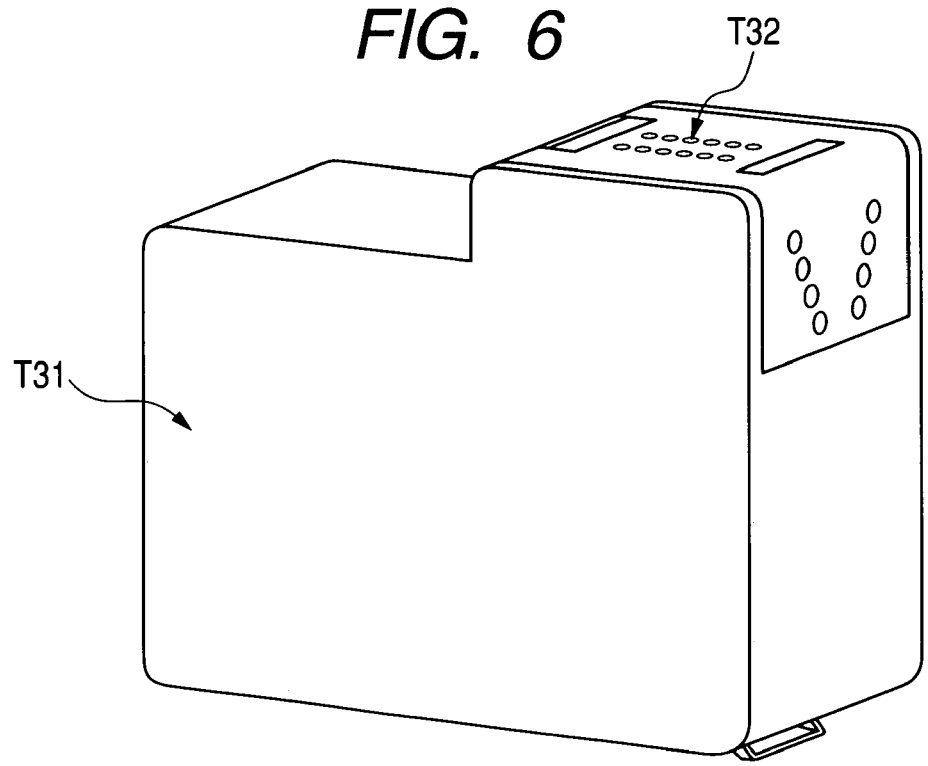
FIG. 6 is an appearance perspective view of an ink tank to which nozzles are connected, in an embodiment of the present invention.

An ink tank having the form shown in FIG. 5 is an ink tank in the interior of which an absorber member (shown by network lines in the drawing) T22 such as a sponge as a negative-pressure generation mechanism is substantially all over disposed, and which holds therein an ink to be fed to an ink-jet recording head, in the state the ink is held by the absorber member T22. A tank housing is provided at its upper end with an atmosphere communication opening T23, and is provided at its bottom part with an ink feed opening T24 connected to the recording head.

An ink tank having the form shown in FIG. 6 has an ink container T31, and nozzles T32 through which the ink is to be ejected.

The ink tank of the present invention may also have a means for keeping ink use-up recording. Accordingly, an ink-jet recording apparatus for carrying out the ink-jet recording process in which apparatus the ink tank of the present invention is to be set may have an inhibition mode which performs no recording on the basis of information on the ink tank standing used-up.

As the means for keeping ink use-up recording, usable are known means as exemplified by a means in which a memory is installed in the ink tank and use-up information is written in the memory, and a mechanical means such that the ink tank has a lever, where the lever is usually kept down when the ink is used and on the other hand the lever ascends when the ink is used up, to inhibit the ink-jet recording apparatus from operating.

An example of such a system for keeping the ink use-up recording is shown in FIG. 4 in respect of a case in which the memory is installed in the ink tank.

The ink tank 100 is set in an ink-jet recording apparatus P and put into usual use, whereupon the information on ink consumption is read by a dot counter DC provided in the ink-jet recording apparatus P. The information having been read there is transmitted as input information I from the ink-jet recording apparatus P to a memory M of the ink tank 100, and is recorded in the memory M.

The ink in the ink tank 100 decreases to come into the state the ink has been used up, whereupon, from the ink tank holding the information to that effect, the output information U is transmitted to the ink-jet recording apparatus P, so that an ink judgement means X provided in the ink-jet recording apparatus P works to inhibit the ink-jet recording apparatus P from operating for recording.

Thereafter, depending on cases, the ink tank 100 whose ink has been used up is reclaimed, and the memory M installed in the ink tank 100 is reset so that the ink tank 100 set up again can be used in the ink-jet recording apparatus P.

Figure 7:
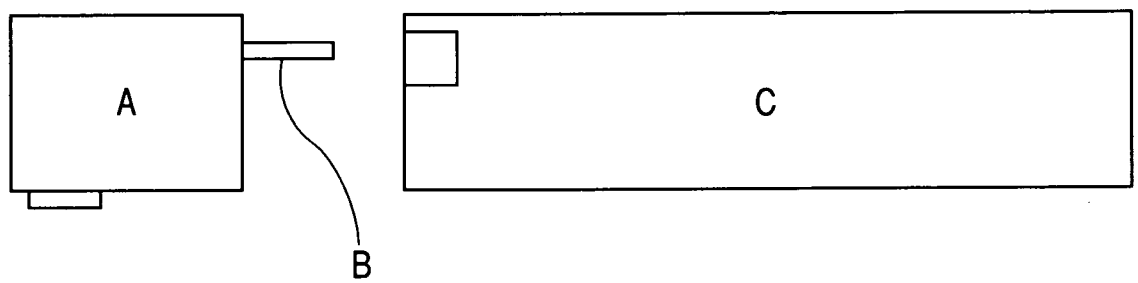
FIG. 7 is a view showing a part of an ink-jet recording apparatus in which an ink feed part or feed path of a subsidiary ink tank is joined to a main ink tank only when an ink is fed from the main ink tank to the subsidiary ink tank, and the ink feed part or feed path stands exposed to the atmosphere except when the ink is fed to the subsidiary ink tank.
Figure 8:
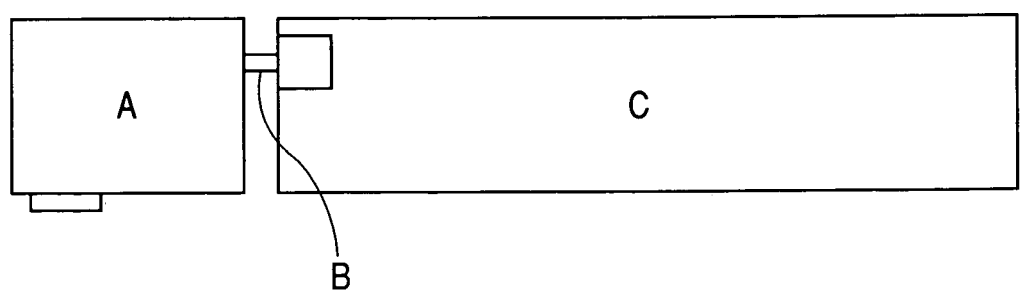
FIG. 8 is a view showing a state in which, in order to feed an ink from the main ink tank to the subsidiary ink tank which are shown in FIG. 7, the ink feed part or feed path of the subsidiary ink tank is kept joined to the main ink tank.

FIGS. 7 and 8 are views showing a part of an ink-jet recording apparatus in which an ink feed part or feed path of a subsidiary ink tank is joined to a main ink tank only when the ink is fed from the main ink tank to the subsidiary ink tank, and the ink feed part or feed path stands exposed to the atmosphere except when the ink is fed to the subsidiary ink tank.

The ink according to the present invention, when used in the ink-jet recording apparatus in which the ink feed part or feed path (B in FIG. 7) of the subsidiary ink tank is joined (FIG. 8) to the main ink tank (C in FIG. 7) only when the ink is fed from the main ink tank to the subsidiary ink tank (A in FIG. 7) and the ink feed part or feed path stands exposed to the atmosphere except when the ink is fed to the subsidiary ink tank, may cause no deposition of solid matter at the atmosphere communication part. This is very effective in that the ink can well be fed.

(Ink-jet Recording Process)

Using the ink of the present invention, an ink-jet recording process may preferably be used which comprises ejecting the ink from an orifice in accordance with recording signals to perform recording on a recording medium. In particular, an ink-jet recording process may more preferably be used in which heat energy is made to act on the ink to perform recording on a recording medium.

In virtue of the foregoing, the present inventors have found a fundamental technical idea for preventing the changes in tone of images and at the same time for bringing as an additional effect the effect of securing the ink reliability that coloring materials can be restrained from their deposition at the nozzles and the like of the recording head. More specifically, it has turn out that the cooperative action attributable to structural relationship between the chief, dimer coloring material and monomer coloring material and further the water-soluble organic solvent brings the first subject of the present invention into solution when the ink fulfills the following conditions as far as various kinds of the chief coloring materials are used and a large number of water-soluble organic solvents are applied. That is, the ink can have the effect of preventing the changes in tone of images and at the same time securing the ink reliability, in virtue of a water-based ink comprising a water-soluble dimer coloring material having a molecular structure having two chromophores and being symmetrical via a linking group, and being decomposable, a water-soluble monomer coloring material having the same structure as the molecular structure obtained by the decomposition of the water-soluble dimer coloring material, and a first water-soluble organic solvent which is a triol compound being liquid at normal temperature and having less than 5 carbon atoms, capable of restraining the water-soluble dimer coloring material from being decomposed; the water-soluble monomer coloring material being from 1% or more to 12% or less in weight with respect to the weight of the water-soluble dimer coloring material. This invention is of course practiced by the fist-category invention.

EXAMPLES

The present invention is described below in greater detail by giving working examples, comparative examples and use examples. In the following, "%" is by weight unless particularly noted.

Respective components formulated as shown in Tables 1 and 2 were well mixed and dissolved, followed by filtration by a filter with 0.2 μm under pressure to prepare Inks 1 to 7.

TABLE 1

Formulation of Ink (% by weight)

| | Ink | | | | | | |
|---|---|---|---|---|---|---|---|
| | 1 | 2 | 3 | 4 | 5 | 6 | 7 |
| Glycerol: | 4 | 4 | 4 | 4 | 0 | 0 | 0 |
| Diethylene glycol: | 8 | 10 | 18 | 5 | 8 | 12 | 24 |
| Triethylene glycol: | 1 | 0 | 0 | 1 | 1 | 0 | 0 |
| Tetraethylene glycol: | 3 | 0 | 0 | 3 | 3 | 0 | 0 |
| 1,2,6-Hexane triol: | 4 | 6 | 0 | 4 | 8 | 8 | 0 |
| Urea: | 0 | 0 | 0 | 10 | 0 | 0 | 0 |
| ACETYLENOL E100*1: | 0.2 | 0.2 | 0.2 | 0.2 | 0.2 | 0.2 | 0.2 |
| Isopropyl alcohol: | 2.5 | 2.5 | 2.5 | 2.5 | 2.5 | 2.5 | 2.5 |
| Ion-exchanged water: | 74.3 | 74.3 | 72.3 | 67.3 | 74.3 | 74.3 | 70.3 |
| Water-soluble dimer coloring material*2: | 3 | 3 | 3 | 3 | 3 | 3 | 3 |

*1 (available from Kawaken Fine Chemicals Co., Ltd.)
*2 C.I. Direct Yellow 132 (the counter ion of a solubilizing group is sodium.)

TABLE 2

Formulation of Ink (% by weight) and Weight Ratio of Water-soluble Monomer Coloring Matter to Water-soluble Dimer Coloring Matter

| | Ink | | | | | | |
|---|---|---|---|---|---|---|---|
| | 1-1 | 2-1 | 3 | 3-1 | 3-2 | 3-3 | 3-4 |
| Glycerol: | 4 | 4 | 4 | 4 | 4 | 4 | 4 |
| Diethylene glycol: | 8 | 10 | 18 | 18 | 18 | 18 | 18 |
| Triethylene glycol: | 1 | 0 | 0 | 0 | 0 | 0 | 0 |
| Tetraethylene glycol: | 3 | 0 | 0 | 0 | 0 | 0 | 0 |
| 1,2,6-Hexane triol: | 4 | 6 | 0 | 0 | 0 | 0 | 0 |

TABLE 2-continued

Formulation of Ink (% by weight) and Weight Ratio of Water-soluble Monomer Coloring Matter to Water-soluble Dimer Coloring Matter

| | Ink | | | | | | |
|---|---|---|---|---|---|---|---|
| | 1-1 | 2-1 | 3 | 3-1 | 3-2 | 3-3 | 3-4 |
| ACETYLENOL E100*1: | 0.2 | 0.2 | 0.2 | 0.2 | 0.2 | 0.2 | 0.2 |
| Isopropyl alcohol: | 2.5 | 2.5 | 2.5 | 2.5 | 2.5 | 2.5 | 2.5 |
| Ion-exchanged water: | 74.3 | 74.3 | 72.3 | 72.3 | 72.4 | 72.5 | 72.4 |
| Water-soluble dimer coloring material*2: | 2.97 | 2.97 | 3 | 2.97 | 2.82 | 2.67 | 2.64 |
| Water-soluble monomer coloring material*3: | 0.03 | 0.03 | 0 | 0.03 | 0.17 | 0.31 | 0.35 |
| Weight ratio of water-soluble monomer coloring matter to water-soluble dimer coloring matter: | 1% | 1% | 0% | 1% | 6% | 12% | 13% |

*1 (available from Kawaken Fine Chemicals Co., Ltd.)
*2 C.I. Direct Yellow 132 (the counter ion of a solubilizing group is sodium.)
*3 (the following chemical formula 1)

As described previously, where the water-soluble dimer coloring material is C.I. Direct Yellow 132, an Na salt of the water-soluble monomer coloring material has the following structure.

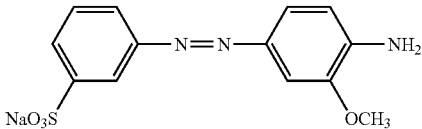

As methods for obtaining the above water-soluble monomer coloring material, available are a method in which an aqueous solution of C.I. Direct Yellow 132 is heated at a high temperature for a long time and products are fractionated by liquid chromatography, and a method in which it is synthesized by conventional procedure.

-Evaluation-

Using the inks obtained as above, ink performance was evaluated as shown below. Here, in using the ink-jet recording apparatus, used was an ink-jet printer PIXUS 850i (trade name; manufactured by CANON INC.), utilizing a heating element as an ejection energy source.

(1) Image Evaluation:

Gain in weight of the water-soluble monomer coloring material formed and changes in tone of images after storage of inks were inspected in the following way. Results obtained are shown in Table 3.

First, each ink shown in Table 1 was poured into a container made of TEFLON (registered trademark of Du Pont), and was stored at each temperature and over each period of time in a closed state. Then, each ink before and after storage was concentrated, followed by addition of heavy water to prepare a sample for measurement to make $^1$H-NMR measurement on each sample. From the integral value of the spectrum obtained, the loss in weight of the water-soluble dimer coloring material in the ink and the gain in weight of the water-soluble monomer coloring material formed in the ink were calculated. Also, the coefficient of acceleration was calculated from the ink storage temperature and storage period to estimate the loss in weight of the water-soluble dimer coloring material and the gain in weight of the water-soluble monomer coloring material formed, as those after storage corresponding to that for 3 years at 25° C.

Further, an ink tank filled with each of unstored inks and inks having stored correspondingly to storage for 3 years at 25° C. by appropriately controlling the storage temperature and storage period was set in the ink-jet recording apparatus. The ink was shot at various duties (gradations) of 10% to 100% at the intervals of 10% and at a recording density of 2,400 dpi×1,200 dpi and an ejection quantity of 2.5 pl to form solid images on SP-101 (trade name; available from CANON INC.). Images obtained using inks before and after storage were measured with SPECTROLINO, manufactured by GRETAG Co., under conditions of light source: D50 and visual field: 2°. From the L*a*b* obtained, the $\Delta E \, (=[(\Delta L^*)^2 + (\Delta a^*)^2 + (\Delta b^*)^2]^{1/2})$ of images having the same duties, formed using the inks before and after storage was calculated. Among the values found, the largest value of $\Delta E$ was represented by $\Delta E$max. Then, using that value, evaluation was made according to the following criteria.

A: The $\Delta E$max is 3.2 or less.
C: The $\Delta E$max is more than 3.2.

TABLE 3

Image Evaluation Results

| Ink | | Weight ratio of water-soluble monomer coloring material to water-soluble dimer coloring material | Image evaluation |
|---|---|---|---|
| Example: | | | |
| 1 | Ink 1; after storage corr. to that for 3 years at 25° C. | 11.1% | A |
| 2 | Ink 2; after storage corr. to that for 3 years at 25° C. | 11.3% | A |
| 3 | Ink 3; after storage corr. to that for 3 years at 25° C. | 10.4% | A |
| Comparative Example: | | | |
| 1 | Ink 5; after storage corr. to that for 3 years at 25° C. | 13.8% | C |
| 2 | Ink 6; after storage corr. to that for 3 years at 25° C. | 14.3% | C |
| 3 | Ink 7; after storage corr. to that for 3 years at 25° C. | 13.5% | C |
| 4 | Ink 1; after storage corr. to that for 3.5 years at 25° C. | 13.0% | C |

As shown in Table 3, the weight ratio of the water-soluble monomer coloring material to the water-soluble dimer coloring material which were contained in ink when Inks 1, 2 and 3 were stored correspondingly for 3 years at 25° C. was 12% or less in every case. Also, the $\Delta E$ between the images obtained using these inks and the images obtained using unstored inks was 3.2 or less, and hence the changes in tone of images were tolerable.

On the other hand, as also shown in Table 3, the weight ratio of the water-soluble monomer coloring material to the water-soluble dimer coloring material which were contained in ink when Inks 5, 6 and 7, which contained no first water-soluble organic solvent, were likewise stored correspondingly for 3 years at 25° C. was more than 12% in every case. Also, the ΔE between the images obtained using these inks and the images obtained using unstored inks was more than 3.2, and hence the changes in tone of images came not tolerable. Also, as shown in Table 3, even in the case of Ink 1, the weight ratio of the water-soluble monomer coloring material to the water-soluble dimer coloring material which were contained in ink when the ink were stored correspondingly to storage for 3.5 years at 25° C. was 13%, and the changes in tone of images came not tolerable.

In the present inventor's opinion, it is judged that it is enough for the storage period of ink to be 3 years. That is, the ΔE of changes in tone of images formed after storage for 3 years after the preparation of ink may be 3.2 or less.

Incidentally, the same results were obtained also on inks not stored in the containers made of TEFLON (registered trademark of Du Pont) but stored in the form of ink tanks.

(2) Evaluation of Sticking Recovery Performance:

The amount of the water-soluble monomer coloring material added and the recording head sticking recovery performance in a case in which the total of the water-soluble dimer coloring material and one formed when the water-soluble monomer coloring material turned to the water-soluble dimer coloring material was 3% by weight were evaluated in the following way and according to the following criteria. Results obtained are shown in Table 4.

First, the ink tank of the ink-jet recording apparatus was filled with each ink shown in Table 2. After prescribed restoration was operated, a pattern for printing check was printed. Next, the recording head was taken out of the main body of the ink-jet printer and the ink tank was detached therefrom, and this was put into a desiccator and left for 5 days in an environment of 25° C. and in the state of reduced pressure set to 1 Pa by means of a rotary pump. Subsequently, after return to normal pressure, this recording head was left for 24 hours at 25° C. and at a humidity of 50% RH, which was then again set in the ink-jet recording apparatus and to which the ink tank was attached. Further, subsequent to restoration operation (suction operation), printing was performed, and evaluation was made according to the following criteria. Incidentally, the quantities of the water-soluble dimer coloring material and water-soluble monomer coloring material before and after the storage under the above conditions stood substantially unchanged.

AA: The printer returns to normal printing condition by restoration operation made twice or less.

A: The printer returns to normal printing condition by restoration operation made three times.

C: Restoration operation must be made four times or more, and the ink is not injectable or print disorder is seen.

TABLE 4

Sticking Recovery Performance Evaluation Results

|  | Ink | Sticking recovery performance |
|---|---|---|
| Example: | | |
| 4 | Ink 1-1 | AA |
| 5 | Ink 2-1 | AA |
| 6 | Ink 3-1 | A |
| 7 | Ink 3-2 | A |
| 8 | Ink 3-3 | AA |
| Reference Example: | | |
| 1 | Ink 3-4 | AA |
| Comparative Example: | | |
| 5 | Ink 3 | C |

As can be seen from Table 4, there is no problem on the sticking recovery performance in actual use, as long as the water-soluble monomer coloring material contained in the ink is in a content of 1% by weight or more based on that of the water-soluble dimer coloring material.

(3) Evaluation of Deposition of Ink:

In order to simulate the deposition of ink at the ink feed part or feed path standing exposed to the atmosphere, a pipe of 0.5 mm in outer diameter, 0.32 mm in inner diameter and 20 mm in length and made of SUS 304 stainless steel was filled with the ink, and this pipe was put into a desiccator in the state it was set upright, and left for 5 days in an environment of 25° C. and in the state of reduced pressure set to 1 Pa by means of a rotary pump. After return to normal pressure, this pipe was left for 24 hours at 25° C. and at a humidity of 50% RH, and the inner surface of the pipe was observed. Results obtained are shown in Table 5. Incidentally, the quantities of the water-soluble dimer coloring-material and water-soluble monomer coloring material before and after the storage under the above conditions stood substantially unchanged. The ink feed performance becomes worse as there is much deposits.

AA: Any deposit is not there at all, or only in a very small quantity.

A: Deposits appear partly.

B: Deposits appear.

TABLE 5

Evaluation Results on Deposition of Ink at Ink Feed Part or Feed Path

|  | Ink | Ink Feed Part or Feed Path Deposition Evaluation Results |
|---|---|---|
| Example: | | |
| 9 | Ink 1-1 | AA |
| 10 | Ink 2-1 | A |
| Reference Example: | | |
| 2 | Ink 3-1 | B |

As can be seen from Table 5, Ink 2-1, in which the second water-soluble organic solvent is contained, is superior in ink feed performance to Ink 3-1 in which the second water-soluble organic solvent is not contained. Also, on Ink 1-1, in which triethylene glycol and tetraethylene glycol are further contained in the ink, better results are obtained.

The ink according to the principal invention constituted as described above can achieve simplification of ink formulation while preventing changes in tone of images especially when used in ink-jet recording systems. It also has, as an additional effect, the effect of securing the ink reliability that coloring materials can be restrained from their deposition at the nozzles and the like of the recording head. In that regard, the ink according to the principal invention shows a clear superiority to conventional inks and has superior properties. In the first-category invention, it especially shows a clear superiority to conventional inks and has superior properties.

This application claims priority from Japanese Patent Application No. 2003-412455 filed on Dec. 10, 2003, which is hereby incorporated by reference herein.

What is claimed is:

1. A water-based ink comprising:
   a water-soluble dimer coloring material having a molecular structure having two chromophores and being symmetrical via a decomposable linking group;
   a water-soluble monomer coloring material having the same structure as the molecular structure obtained by the decomposition of the linking group in the water-soluble dimer coloring material; and
   a first water-soluble organic solvent which is a triol compound being liquid at normal temperature and having less than 5 carbon atoms, capable of restraining the water-soluble dimer coloring material from being decomposed;
   said water-soluble monomer coloring material being from 1% or more to 12% or less in weight with respect to the weight of said water-soluble dimer coloring material.

2. The water-based ink according to claim 1, which further comprises a second water-soluble organic solvent which is a triol compound being liquid at normal temperature and having 5 or more carbon atoms.

3. The water-based ink according to claim 1, which further comprises at least one of diethylene glycol, triethylene glycol and tetraethylene glycol.

4. The water-based ink according to claim 1, which does not contain any substance which decomposes or changes in time sequence to salt out said water-soluble dimer coloring material and said water-soluble monomer coloring material.

5. The water-based ink according to claim 1, wherein said linking group is a urea bond.

6. The water-based ink according to claim 1, wherein said water-soluble dimer coloring material is C.I. Direct Yellow 132.

7. An ink tank comprising: a ink container holding a water-based ink,
   said water-based ink containing a water-soluble dimer coloring material having a molecular structure having two chromophores and being symmetrical via a decomposable linking group;
   a water-soluble monomer coloring material having the same structure as the molecular structure obtained by the decomposition of the linking group in the water-soluble dimer coloring material; and
   a first water-soluble organic solvent which is a triol compound being liquid at normal temperature and having less than 5 carbon atoms, capable of restraining the water-soluble dimer coloring material from being decomposed;
   said water-soluble monomer coloring material being from 1% or more to 12% or less in weight with respect to the weight of said water-soluble dimer coloring material.

8. The ink tank according to claim 7, wherein said ink further comprises a second water-soluble organic solvent which is a triol compound being liquid at normal temperature and having 5 or more carbon atoms.

9. The ink tank according to claim 7, wherein said ink further comprises at least one of diethylene glycol, triethylene glycol and tetraethylene glycol.

10. The ink tank according to claim 7, wherein said ink does not contain any substance which decomposes and changes in time sequence to salt out said water-soluble dimer coloring material and said water-soluble monomer coloring material.

11. The ink tank according to claim 7, wherein said linking group is a urea bond.

12. The ink tank according to claim 7, wherein said water-soluble dimer coloring material is C.I. Direct Yellow 132.

13. The ink tank according to claim 7, which is used in an ink-jet recording apparatus having an ink feed part or feed path standing exposed to the atmosphere.

14. An ink-jet recording process comprising ejecting an ink from an orifice in accordance with recording signals to perform recording on a recording medium, wherein said ink is the water-based ink according to claim 1.

15. A water-based ink comprising:
   a water-soluble dimer coloring material having a molecular structure having two chromophores and being symmetrical via a linking group, and being decomposable;
   a water-soluble monomer coloring material having the same structure as the molecular structure obtained by the decomposition of the water-soluble dimer coloring material; and
   a first water-soluble organic solvent which is a triol compound being liquid at normal temperature and having less than 5 carbon atoms, capable of restraining the water-soluble dimer coloring material from being decomposed;
   said water-soluble monomer coloring material being from 1% or more to 12% or less in weight with respect to the weight of the water-soluble dimer coloring material.

16. The water-based ink according to claim 1, wherein the first water-soluble organic solvent is in a content of from 3% by weight or more to 8% by weight or less based on the total weight of the ink.

* * * * *

UNITED STATES PATENT AND TRADEMARK OFFICE
CERTIFICATE OF CORRECTION

PATENT NO. : 7,288,143 B2 Page 1 of 1
APPLICATION NO. : 11/006625
DATED : October 30, 2007
INVENTOR(S) : Aikawa et al.

It is certified that error appears in the above-identified patent and that said Letters Patent is hereby corrected as shown below:

COLUMN 1:
Line 44, "come" should read --become--.

COLUMN 13:
Line 14, "came" should read --became--.
Line 21, "came" should read --became--.

COLUMN 14:
Line 42, "is much" should read --are much--.

Signed and Sealed this

Thirtieth Day of September, 2008

JON W. DUDAS
*Director of the United States Patent and Trademark Office*